United States Patent
Bak et al.

(10) Patent No.: US 11,132,054 B2
(45) Date of Patent: Sep. 28, 2021

(54) ELECTRONIC APPARATUS, CONTROL METHOD THEREOF AND ELECTRONIC SYSTEM

(71) Applicant: SAMSUNG ELECTRONICS CO., LTD., Suwon-si (KR)

(72) Inventors: Bonggil Bak, Suwon-si (KR); Donghwan Ji, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 16/539,346

(22) Filed: Aug. 13, 2019

(65) Prior Publication Data

US 2020/0057489 A1 Feb. 20, 2020

(30) Foreign Application Priority Data

Aug. 14, 2018 (KR) .................. 10-2018-0095069

(51) Int. Cl.
*G06F 3/01* (2006.01)
*G06F 3/147* (2006.01)
(Continued)

(52) U.S. Cl.
CPC ............. *G06F 3/012* (2013.01); *G06F 3/147* (2013.01); *G06F 3/16* (2013.01); *G06T 13/40* (2013.01)

(58) Field of Classification Search
None
See application file for complete search history.

(56) References Cited

U.S. PATENT DOCUMENTS 8,576,276 B2 11/2013 Bar-Zeev et al.
9,236,032 B2 1/2016 Choi et al.
(Continued)

FOREIGN PATENT DOCUMENTS

EP 3 398 666 11/2018
JP 2017-119031 7/2017
(Continued)

OTHER PUBLICATIONS

International Search Report and Written Opinion dated Oct. 29, 2019 in counterpart International Application No. PCT/KR2019/008873.
(Continued)

*Primary Examiner* — Yi Wang
(74) *Attorney, Agent, or Firm* — Nixon & Vanderhye P.C.

(57) ABSTRACT

An electronic apparatus is provided. The electronic apparatus according to an embodiment includes a storage, a communicator comprising communication circuitry, and a processor configured to render a virtual reality (VR) image including a first object corresponding to a first display device based on VR image information stored in the storage, wherein the processor is further configured to receive motion information of a second display device from the second display device through the communicator, to render one area of the VR image including the first object based the first object being included in a view of a second object corresponding to the second display device based on the motion information of the second display device, and to control the communicator to transmit the rendered one area of the VR image to the second display device.

18 Claims, 16 Drawing Sheets

(51) Int. Cl.
*G06F 3/16* (2006.01)
*G06T 13/40* (2011.01)

(56) References Cited

U.S. PATENT DOCUMENTS

| | | |
|---|---|---|
| 9,396,588 B1 | 7/2016 | Li |
| 9,566,506 B2 | 2/2017 | Han et al. |
| 10,262,461 B2 | 4/2019 | Nakashima et al. |
| 2009/0254843 A1 | 10/2009 | Van Wie et al. |
| 2010/0064259 A1* | 3/2010 | Alexanderovitc .. G06F 3/04815 715/852 |
| 2011/0225516 A1 | 9/2011 | Goldman et al. |
| 2012/0287350 A1 | 11/2012 | Song et al. |
| 2013/0038601 A1 | 2/2013 | Han et al. |
| 2015/0287403 A1 | 10/2015 | Holzer Zaslansky et al. |
| 2015/0362733 A1 | 12/2015 | Spivack |
| 2015/0381938 A1 | 12/2015 | Cunico et al. |
| 2016/0041391 A1 | 2/2016 | Van Curen et al. |
| 2016/0217621 A1 | 7/2016 | Raghoebardajal et al. |
| 2018/0075653 A1 | 3/2018 | Schillings |
| 2018/0165863 A1 | 6/2018 | Kubo et al. |
| 2018/0185753 A1 | 7/2018 | Nakagawa et al. |

FOREIGN PATENT DOCUMENTS

| | | |
|---|---|---|
| JP | 6244593 | 12/2017 |
| JP | 6263252 | 1/2018 |
| JP | 2018-124981 | 8/2018 |
| JP | 2018124981 A * | 8/2018 |
| KR | 10-0916706 | 9/2009 |
| KR | 10-2013-0082693 | 7/2013 |
| KR | 10-2015-0030993 | 3/2015 |
| KR | 10-2018-0023759 | 3/2018 |
| KR | 10-1839118 | 3/2018 |
| KR | 10-1839122 | 3/2018 |

OTHER PUBLICATIONS

Extended Search Report dated Jan. 13, 2020 in counterpart European Patent Application No. 19186841.3.

European Office Action dated Mar. 2, 2021 for EP Application No. 19186841.3.

* cited by examiner

ELECTRONIC APPARATUS, CONTROL METHOD THEREOF AND ELECTRONIC SYSTEM

CROSS-REFERENCE TO RELATED APPLICATION

This application is based on and claims priority under 35 U.S.C. § 119 to Korean Patent Application No. 10-2018-0095069, filed on Aug. 14, 2018, in the Korean Intellectual Property Office, the disclosure of which is incorporated by reference herein in its entirety.

BACKGROUND

1. Field

The disclosure relates to an electronic apparatus, a controlling method thereof, and an electronic system, and for example, to an electronic apparatus for providing a Virtual Reality (VR) image, a controlling method thereof, and an electronic system.

2. Description of Related Art

Recently, people increasingly play games, and appreciate images through virtual reality apparatuses. A virtual reality technology realizes a sense of immersion at the extreme level by controlling a cognitive system of a user.

Meanwhile, it is a widely known factor that overall quality of images and sounds are critical to double impression in consuming multimedia contents such as films or interactive games. However, with the same content, who you are with may be a key factor in consuming contents. However, not so much focus is put on sharing impression with others, which is one of the most important elements of content appreciation due to the structural characteristic that strongly controls the cognitive system.

In addition, when a problem such as network error occurs to one user while a plurality of users appreciate an image in a virtual space, the other users may be disrupted to view the image by user's non-reaction or abnormal reaction.

Accordingly, there is a rising demand for a method for providing a sense of immersion in virtual reality at the extreme level, and maximize interaction between others as well as minimizing disturbance of image appreciation even if a problem occurs.

SUMMARY

An example aspect of various example embodiments relates to an electronic apparatus for providing a VR image for a virtual space for sharing each other's impressions even if users are in different places, a controlling method thereof, and an electronic system. According to an embodiment, an electronic device is provided, the electronic device including a storage, a communicator comprising communication circuitry, a processor configured to render a VR image including a first object corresponding to a first display device based on Virtual Reality (VR) image information stored in the storage, wherein the processor is further configured to receive motion information of a second display device from the second display device through the communicator based on the first object being included in a view of a second object corresponding to the second display device based on the motion information of the second display device, render one area of the VR image including the first object, and control the communicator to transmit the rendered one area of the VR image to the second display device.

The processor may be further configured to, receive motion information of the first display device from the first display device through the communicator, and render one area of the VR image by changing a motion of the first object based on the motion information of the first display device.

The processor may be further configured to identify a view of the second object based on a location of the second object and the motion information of the second display device.

The processor may be further configured to render the VR image including a content reproduction area.

The processor may be further configured to control the communicator to transmit the rendered one area of the VR image and a content to the second display device, and to change the motion of the first object based on a mood type of the content during a predetermined reproduction section based on a time point based on the motion information of the second display device being received and the motion information of the first display device.

The processor may be further configured to, based on a third object being included in the view of the second object, render one area of the VR image by changing a motion of the third object based on motion information of the third object stored in the storage, and to control the communicator to transmit the rendered one area of the VR image and a content to the second display device, wherein the motion information of the third object includes motion information received from a third display device based on the content being reproduced by the third display device.

The processor may be further configured to, based on a third object being further included in the view of the second object, render the rendered one area of the VR image by changing a motion of the third object based on animation information of the third object stored in the storage, wherein the animation information on the third object includes motion information pre-generated by a producer based on a mood type of a content.

The processor may be further configured to add sound of the first object to the rendered one area of the VR image based on first sound information received from the first display device and to control the electronic device to transmit the VR image.

The processor may be further configured to control the communicator to transmit the rendered one area of the VR image and a content to the second display device, and to change the motion of the first object based on a mood type of the content based on the motion information of the first display device not being received from the first display device during a predetermined first time period or the received motion information of the first display device not being changed during a predetermined second time period.

The processor may be further configured to store the received motion information of the first display in the storage based on the mood type of the content, to change the motion of the first object based on motion information corresponding to a mood type of a present reproduction section of the content among motion information of the first display device stored in the storage based on the motion information of the first display device not being received from the first display device during the predetermined first time period, or the received motion information of the first display device not being changed during the predetermined second time period.

The processor may be further configured to, based on the motion information corresponding to the mood type of the present reproduction section of the content not being stored in the storage, change the motion of the first object based on animation information corresponding to the mood type among animation information stored in the storage.

According to an example embodiment, an electronic system is provided, the electronic system, including a first display device comprising a display, a second display device comprising a display, and an electronic apparatus configured to render a VR image including a first object corresponding to the first display device based on Virtual Reality (VR) image information, wherein the electronic apparatus is further configured to receive motion information of a second display device from the second display device, based on the first object being included in a view of the second object corresponding to the second display device based on motion information of the second display device, to render one area of the VR image including the first object, and to control the electronic apparatus to transmit the rendered one area of the VR image to the second display device, wherein a second HMD device displays one area of the VR image received from the electronic apparatus.

According to an example embodiment, a method for controlling an electronic apparatus is provided, the method including rendering a VR image including a first object corresponding to a first display device based on Virtual Reality (VR) image information, receiving motion information of a second display device from the second display device based on the first object being included in a view of the second object corresponding to the second display device based on the motion information of the second display device, rendering one area of the VR image including the first object, and transmitting the rendered one area of the VR image to the second display device.

The rendering of the one area of the VR image may include receiving motion information of the first display device from the first display device, and rendering the one area of the VR image by changing a motion of the first object based on the motion information of the first display device.

The rendering of the one area of the VR image may include identifying the view of the second object based on a location of the second object and the motion information of the second display device.

The rendering of the VR image may include rendering the VR image including a content reproduction area.

The transmitting may include transmitting a content to the second display device, wherein the rendering of the one area of the VR image comprises changing the motion of the first object based on a mood type of the content during a predetermined reproduction section based on a time point when the motion information of the second display device is received and the motion information of the first display device.

The rendering of the one area of the VR image may include, based on a third object being included in the view of the second object, rendering the one area of the VR image by changing a motion of the third object based on pre-stored motion information of the third object, wherein the transmitting comprises transmitting the one area of the VR image and a content to the second display device, and wherein the pre-stored motion information of the third object is motion information received from a third display device based on the content being reproduced by the third display device.

The rendering of the one area of the VR image may include, based on the third object being included in the view of the second object, rendering the one area of the VR image by changing a motion of the third object based on pre-stored animation information of the third object, and wherein the pre-stored animation information of the third object includes motion information pre-generated by a producer based on a mood type of a content.

The transmitting may include adding sound of the first object to the rendered one area of the VR image based on first sound information received from the first display device and transmitting the VR image.

According to the above-described various example embodiments, an electronic apparatus may change a motion of an object corresponding to a display device in a virtual space based on motion information received from the display device and provide the impression of a user of the display device to a use of another display device.

BRIEF DESCRIPTION OF THE DRAWINGS

The above and other aspects, features and attendant advantages of certain embodiments of the present disclosure will be more apparent from the following detailed description, taken in conjunction with the accompanying drawings, in which.

DETAILED DESCRIPTION

Figure 1:
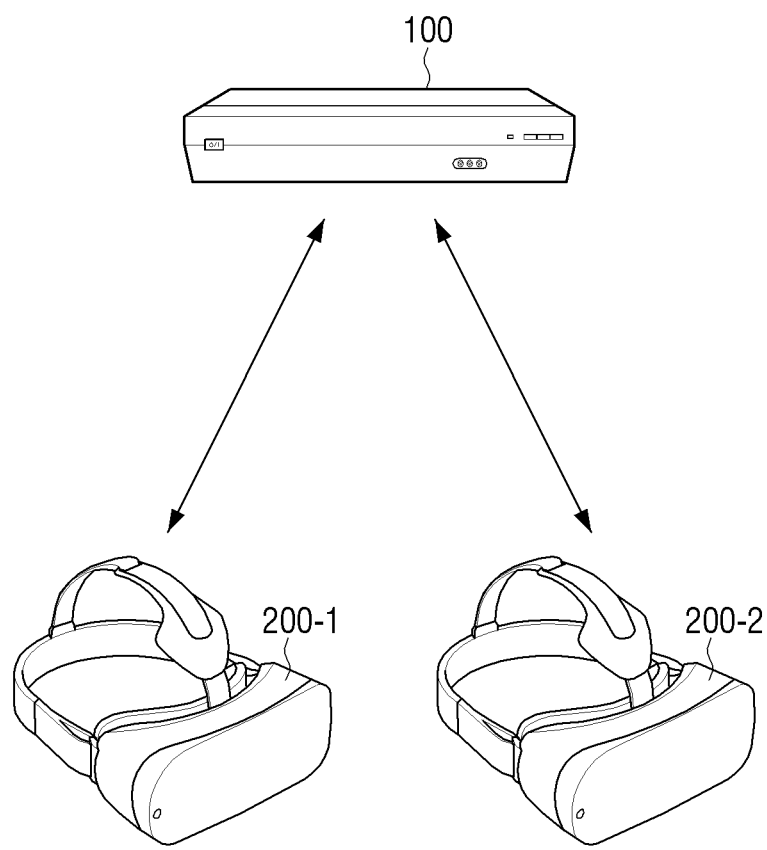
FIG. 1 is a diagram illustrating an example electronic system according to an embodiment of the disclosure.

The various example embodiments of the present disclosure may be diversely modified. Accordingly, various example embodiments are illustrated in the drawings and are described in greater detail in the disclosure. However, it is to be understood that the present disclosure is not limited to any specific example embodiment, but includes all modifications, equivalents, and substitutions without departing from the scope and spirit of the present disclosure. Also, well-known functions or constructions may not described in detail where they might obscure the disclosure with unnecessary detail.

Hereinafter, example embodiments will be described in greater detail with reference to the drawings attached hereto.

FIG. 1 is a diagram illustrating an example electronic system according to an embodiment of the disclosure. Referring to FIG. 1, an electronic system 1000 may include an electronic apparatus 100, a first display device 200-1, and a second display device 200-2. FIG. 1 illustrates that the first display device 200-1, and the second display device 200-2 are Head Mounted Displays (HMD), but they could be glasses. In other words, any form of apparatus could be used as long as the first display device 200-1, and the second display device 200-2 could be worn by a user body so that a user can view an image. Hereinafter, for ease of explanation, it will be described that the first display device 200-1, and the second display device 200-2 are HMD devices, but it will be understood that the disclosure is not limited thereto.

The electronic apparatus 100 may be configured to render a virtual reality (VR) image. The VR image may be referred to, for example, as a virtual reality image, and the virtual reality may refer, for example, to a human-computer interface that renders a certain environment or situation computerized and makes the person who uses it behave as if she/he is actually interacting with surroundings or environments. Rendering may refer, for example, to a process of generating a three-dimensional image based on external information such as a light source, a location, a color, etc. In other words, the electronic apparatus 100 may render a VR image for a three-dimensional virtual space.

The electronic apparatus 100 may render a VR image including at least one of a first object corresponding to the first display device 200-1, and a second object corresponding to the second display device 200-2 that performs communication with the electronic apparatus 100. For example, the electronic apparatus 100 may render a VR image of a virtual space in which the first and second objects are seated in the audience and watch a movie on a screen. The first and second objects may be images of users, characters, or celebrities. The electronic apparatus 100 may provide a plurality of characters and celebrity images to the first display device 200-1, and the second display device 200-2. The first display device 200-1, and the second display device 200-2 may display a plurality of characters and celebrity images as a menu, and if one of them is selected, may transmit information thereof to the electronic apparatus 100. The electronic apparatus 100 may set an object corresponding to each display device based on the received information.

The electronic apparatus 100 may receive first motion information and second motion information from each of the first display device 200-1, and the second display device 200-2, respectively, and render the first and second objects based on the first and second motion information, respectively. The first and second motion information may be motion information based on the motions of the first user of the first display device 200-1 and the second user of the second display device 200-2.

For example, when the second user rotates his/her head to the left side, the second display device 200-2 may sense the motion of the second user through a sensor in the display device 200-2, and transmit the sensed second motion information to the electronic apparatus 100. When the second object is a user image, the electronic apparatus 100 may rotate the head of the second object based on the second motion information.

The electronic apparatus 100 may render a VR image in real time, and transmit one area of the VR image to the first display device 200-1, and the second display device 200-2. For example, the electronic apparatus 100 may transmit the first area of the VR image corresponding to the view of the first object at the location of the first object in the virtual space to the first display device 200-1, and the second area of the VR image corresponding to the view of the second object at the location of the second object in the virtual space to the second display device 200-2.

The electronic apparatus 100 may identify (e.g., determine) the first area of the VR image and the second area of the VR image based on the first motion information and the second motion information received from the first display device 200-1, and the second display device 200-2. For example, when each of the first object and the second object is a character with eyes, the electronic apparatus 100 may identify the view of the first object based on the first motion information, transmit the first area of the VR image to the first display device 200-1 based on the identified view, identify the view of the second object based on the second motion information, and transmit the second area of the VR image to the second display device 200-2 based on the identified view.

The electronic apparatus 100 for performing the operation may, for example, and without limitation, be a computer, a server, a tablet, a laptop, etc. However, the disclosure is not limited thereto. The electronic apparatus 100 may perform communication with the first display device 200-1, and the second display device 200-2, and any type of apparatus may be used as long as it renders a VR image.

The display device may be a Head Mounted Display (HMD) that is worn on a user's hear and provides a virtual reality service. For example, the display device may, for example, and without limitation, have the shape of a glasses, a headset, a helmet, or the like, providing an image to user's two eyes.

The display device may display an image through a display and provide the image to the front of the user's eyes.

When the display device is an HMD device, glasses legs or a band may be provided at the back of the HMD device to be worn on the user's head. In addition, an operational track pad, a return button, a sound control key, etc. may be mounted on the HMD device.

The HMD device may be a device that requires an additional display. For example, the HMD device may be a body (e.g., a housing) having the shape of glasses, headset or helmet, and a smart phone or a tablet may be attached to the front of the body to provide an image to user's two eyes.

When the user wears an HMD device on her/his head, the area viewed by user's left eye and the area viewed by user's right eye of the display may be spatially separated. Accordingly, the HMD device may display different images on the area viewed by the user's left eye and the area viewed by the user's right eye of the display, so that different images may be incident on the left eye and the right eye.

The HMD device may track the movement of the user's head, and immediately update a view image, and provide a 3D image as well as a 2D image. For example, when the user wears an HMD device on her/his head, the user's view may be fully taken, and a 360-degree image and sound may be provided. A gyro sensor and an acceleration sensor provided in the HMD device may sense that the user moves up, down, left and right so that a visual effect suitable for the direction may be produced.

Accordingly, the user may be provided with one area of the VR image in a direction of user's gaze and experience a virtual reality (VR).

The display device may be glasses. The glasses may be different from the HMD device in terms of the shape, but the operation thereof may be the same as that of the HMD device.

In order to perform the above-described operation, each of the first display device 200-1, and the second display device 200-2 may transmit first motion information of the first display device 200-1 by the first user and second motion information of the second display device 200-2 by the second user to the electronic apparatus 100, respectively. Each of the first display device 200-1, and the second display device 200-2 may receive and display one area of a VR image.

Each of the first motion information and the second motion information may be information obtained by sensing the self-motion of the first display device 200-1 and the self-motion of the second display device 200-2, but the disclosure is not limited thereto. For example, the first motion information and the second information may be information obtained by sensing corresponding users themselves. For example, the display device may further include a camera, sense user's motion, face, etc. through the camera, and transmit the sensed information to the electronic apparatus 100 as motion information.

The first display device 200-1, and the second display device 200-2 may transmit first motion information and second motion information to the electronic apparatus 100, respectively, and the electronic apparatus 100 may render the first area of the VR image and the second area of the VR image based on the received information, and transmit the rendered first area and second area of the VR image to the first display device 200-1 and the second display device 200-2, respectively. However, the disclosure is not limited thereto.

For example, the electronic apparatus 100 may not render only one area of a VR image, but may also render a VR image of an entire virtual space. In this example, the electronic apparatus 100 may transmit the VR image for the entire virtual space to the first display device 200-1, and the second display device 200-2, and the first display device 200-1, and the second display device 200-2 may display part of the received VR image based on the view of the first object and the view of the second object in the virtual space, respectively.

The first display device 200-1, and the second display device 200-2 may transmit the first and second motion information of a predetermined size or more to the electronic apparatus 100. For example, when a user moves very little, the display device may not transmit such the motion information to the electronic apparatus 100, and the electronic apparatus 100 may provide an image without much change of view to the display device. Accordingly, even if a user moves little bit, the user may view a VR image without any shaking.

As described above, the electronic system 1000 has two display devices, but is not limited thereto. For example, the electronic apparatus 1000 may have three display apparatuses or more, and the electronic apparatus 100 may render a VR image to include an object for each of the display devices or more in one virtual space.

The operations of the electronic apparatus 100, the first display device 200-1, and the second display device 200-2 included in the electronic system 1000 have been briefly described. Operations of the electronic apparatus 100, the first display device 200-1, and the second display device 200-2 will be described in greater below.

Figure 2A:
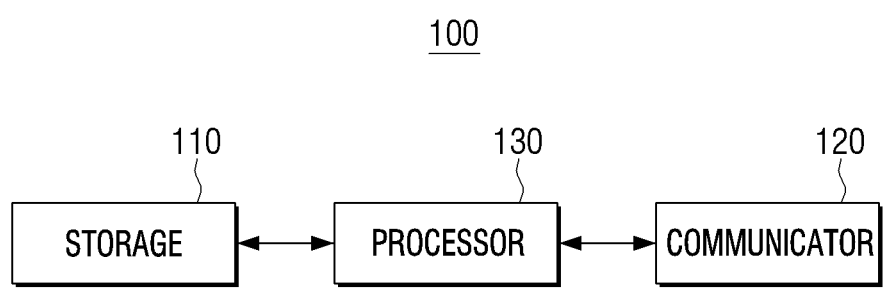
FIG. 2A is a block diagram illustrating an example configuration of an electronic apparatus according to an embodiment of the disclosure.

FIG. 2A is a block diagram illustrating an example configuration of an electronic apparatus according to an embodiment of the disclosure. Referring to FIG. 2A, the electronic apparatus 100 may include a storage 110, a communicator (e.g., including communication circuitry) 120, and a processor (e.g., including processing circuitry) 130.

The storage 110 may store contents, VR image information and object information. For example, the storage 110 may store information on a virtual space corresponding, for example, and without limitation, to a theater, a virtual space corresponding to a hotel, etc. as VR image information. The storage 110 may store images on, for example, and without limitation, characters, celebrities, users, etc. as objects to be included in the virtual space. In addition, the storage 110 may store contents to be provided from a content reproduction area in the virtual space.

The storage 110 may store more motion information. For example, the storage 110 may store motion information received from a display device. For example, when a user of the display device watches a content in a virtual space, the storage 110 may distinguish and store motion information by the mood type of content.

However, the disclosure is not limited thereto. The motion information may be information pre-generated by a content producer. For example, the storage 110 may store the first motion for the first mood type and the second motion for the second mood type, and if the present mood type of the content is the first mood type, the processor 130 may change the motion of an object based on the first motion of the stored motion information.

The storage 110 may also store animation information. The animation information may be information generated by a producer. For example, the producer that performs modeling of an object may pre-generate motion information on how to move the object as animation information. For example, the producer that performs modeling of the object may pre-generate motion information of the object as animation information by the mood type of content.

The storage 110 may include one or more of a hard disc, a non-volatile memory, etc. Any type of configuration could be used as long as it can store data.

The communicator 120 may include various communication circuitry and perform communication with various types of display devices according to various types of communication methods. For example, the processor 130 may receive the first motion information and the second motion information from the first display device 200-1, and the second display device 200-2, respectively, through the communicator 120. The processor 130 may control the communicator 120 to transmit the first area of the VR image and the second area of the VR image to the first display device 200-1, and the second display device 200-2, respectively.

The processor 130 may include various processing circuitry and control the overall operation of the electronic apparatus 100.

According to an embodiment, the processor 130 may include various processing circuitry, such as, for example, and without limitation, a digital signal processor (DSP), a microprocessor, a TCON (Time Controller), or the like, but is not limited thereto. The processor 120 may include various processing circuitry including, for example, and without limitation one or more central processing unit (CPU), a microcontroller unit (MCU), a micro processing unit (MPU), a controller, an application processor (AP), a communication processor (CP), an ARM processor, and the like, or may be defined by the corresponding terms. The processor 130 may be implemented as a system on chip (SoC), a large scale integration (LSI) with a built-in processing algorithm, or in the form of a Field Programmable Gate Array (FPGA).

The processor 130 may render a VR image including the first object corresponding to the first display device 200-1 based on VR image information stored in the storage 110. The processor 130 may receive motion information of the second display device 200-2 from the second display device 200-2 through the communicator 120, and when it is determined that the first object is included in the view of the second object corresponding to the second display device based on the motion information of the second display device 200-2, render one area of the VR image including the first object, and control the communicator 120 to transmit the rendered one area of the VR image to the second display device 200-2.

For example, the processor 130 may render a VR image in which the first character corresponding to the first display device 200-1 is included one area of the virtual space corresponding to a theater. The processor 130, if it is determined that the first character is included in the view of the second character corresponding to the second display device 200-2 based on the second motion information received from the second display device 200-2, may render one area of the VR image including the first character, and transmit the rendered one area of the VR image to the second display device 200-2.

The processor 130 may receive motion information of the first display device 200-1 from the first display device 200-1 through the communicator 120, change the motion of the first object based on the motion information of the first display device 200-1 and render one area of the VR image.

The second display device 200-2 may transmit the second motion information to the electronic apparatus 100 in real time. However, the second motion information, which may be a premise of deformation of the first character may be the second motion information for allowing the first character to be included in one area of the VR image to be provided to the second object according to the second motion information among second information transmitted in real time. In other words, the second motion information may be second information of a moment when the second user turns her/his head and sees the first character. If the view of the second character remains unchanged toward the first character without the second motion information, the processor 130 may change the motion of the first character based on the first motion information. If the first character is out of the view of the second character according to new second motion information, the processor 130 may not change the motion of the first character.

The view of the second character may be within a range viewed by the second character in the virtual space. The view of the second character may correspond to a screen displayed by the second display device. In other words, if the second character moves according to the second motion information, the screen displayed by the second display device may be changed to correspond to the movement of the second character. In other words, the direction of the view of the object may be changed in accordance with motion information.

The range of the view of the object may be changed by operating the second display device by the second user. For example, the second user may operate the second display device to expand the range of the view. In this example, the second user may view a wider range of the VR image.

The processor 130 may identify the view of the second object based on the location of the second object and the second motion information.

For example, the processor 130 may render a VR image in which the second character corresponding to the second user of the second display device 200-2 is included in the virtual space corresponding to the theater, in addition to the first character. The processor 130 may identify one area in the virtual space viewed by the second character based on the second motion information from the location of the second character. The processor 130, if the second motion information is rotation to the right, may rotate the second character to the right from the location of the second character, and identify the one area in the virtual space viewed by the second character.

The processor 130 may render a VR image including a content reproduction area. For example, if a virtual space is a theater, the processor 130 may arrange the first and second objects in the audience of the theater and render a VR image using the screen of the theater as the content reproduction area.

The processor 130 may control the communicator 120 to transmit the rendered one area of the VR image and the contents to the second display device 200-2, and deform the motion of the first object based on the mood type of the content and the first motion information during a predetermined reproduction section based on a time point when the second motion information is received.

The processor 130 may further control the communicator 120 to transmit a content as well as a VR image to the first display device 200-1 and the second display device 200-2. The first display device 200-1, and the second display device 200-2 may overlay and display the content received on the content reproduction area of the VR image.

The processor 130 may deform the motion of the first object further considering the mood type of the content as well as the first motion information. For example, when the content transmitted from the first display device 200-1 to the second display device 200-2 by the processor 130 is, for example, a horror movie, the processor 130 may render the deformation of the motion of the first object in a scary scene to be larger than the deformation of the motion of the first object in a normal scene.

The predetermined reproduction section based on the time point when second motion information is received may be various time sections including the time point when the second motion information is received. For example, the predetermined reproduction section may, for example, be from 10 seconds before the time point when the second motion information is received to a time point when the second motion information is received based on the time point when the second motion information is received. The predetermined reproduction section may, for example, be from 10 seconds before the time point when the second motion information is received to 10 seconds after time point when the second motion information is received. The predetermined reproduction section may, for example, be from the point when the second motion information is received to 10 seconds after the second motion information is received. In the first case, the processor 130 may obtain the mood type of content at the time point when the second motion information is received, but in the second or third case, the processor 130 may not obtain the mood type of content at the time point when second motion information is received. In this example, the processor 130 may obtain the mood type of content after a predetermined time period passes, and render the first object based on the obtained mood type. In other words, the motion deformation of the object may be slower in the second or third case rather than in the first case.

The processor 130, if the third object is further included in the view of the second object, may render one area of the VR image by deforming the motion of the third object based on the third motion information of the third object stored in the storage 110, and control the communicator 120 to transmit the rendered one area of the VR image and the contents to the second display device 200-2. The third motion information of the third object may be motion information obtained from the third display device while the content is reproduced by the third display device.

For example, the third user may view the content using the third display device, and the electronic apparatus 100 may store the third motion information of the third display device while the third user watches the content. When the first and second users watch the content viewed by the third user, the electronic apparatus 100 may render a VR image including the first object, the second object, and the third object. The processor 130 may deform the motions of the first object and the second object based on the received first and second motion information, and the motion of the third object based on pre-stored third motion information. The processor 130 may include the third object in the VR image based on a control command of one of the first and second users.

The processor 130 may provide a UI for guiding whether to allow the third object to be included in the VR image to the first display device 200-1, and the second display device 200-2. When receiving an execution request of a specific content from first display device 200-1, and the second display device 200-2, the processor 130 may identify (e.g., determine) whether motion information of another user who views the specific content is stored in the storage 110, and if the motion information of another user is stored in the storage 110, may provide a UI for guiding whether to allow an object corresponding to another user to be included in a virtual space to the first display device 200-1, and the second display device 200-2.

If the third object is further included in the view of the second object, the processor 130 may render one area of the VR image by deforming the motion of the third object based on the animation information on the third object stored in the storage 110. The animation information on the third object may be motion information pre-generated by a producer according to the mood type of content.

The processor 130 may add the sound of the first object to the rendered one area of the VR image based on first sound information received from the first display device 200-1.

For example, the first display device 200-1 may include a microphone, obtain the voice of the first user through the microphone, and transmit first sound information corresponding to the voice of the first user to the electronic apparatus 100. The electronic apparatus 100 may render one area of a VR image so that the first object outputs sound corresponding to the first sound information in the virtual space.

The processor 130 may control the communicator 120 to transmit the rendered one area of the VR image and the contents to the second display device 200-2, and if first motion information is not received from the first display device 200-1 during a predetermined first time period, or the received first motion information is not changed during a predetermined second time period, the motion of the first object may be deformed based on the mood type of content.

If the first motion information is not received from the first display device 200-1 during the predetermined first time period, or the received first motion information is not changed during predetermined second time period, the processor 130 may determine that communication with the first display device 200-1 may not be performed, or the first user may not use the first display device 200-1. However, the processor 130 may deform the motion of the first object based on the mood type of content because the second user still watches the content in the virtual space. Accordingly, it is possible to minimize and/or reduce the interference of the second user viewing the contents that could occur, for example, when the first object makes no move.

The processor 130 may store the received first motion information in the storage 110 by the mood type of content, and if the first motion information is not received from the first display device 200-2 during the predetermined first time period, or the received first motion information is not changed during the predetermined second time period, the processor 130 may deform the motion of the first object based on the first motion information corresponding to the mood type of the present reproduction section of the content among the first motion information stored in the storage 110.

The processor 130 may store the first motion information in the storage 110 by the mood type of content until an error occurs, and after the error occurs, the processor 130 may render the first object based on the first motion information corresponding to the mood type of the present reproduction section of the content among the first motion information stored in the storage 110. Accordingly, the processor 130 may render the first object more naturally.

The processor 130, if the first motion information corresponding to the mood type of the present reproduction section of the content is not stored in the storage 110, may deform the motion of the first object based on the animation information corresponding to the mood type among the animation information stored in the storage 110.

For example, when the first motion information on all mood types is not stored because a period from a content reproduction time point to a point of error occurrence is too short, the processor 130 may deform the motion of the first object based on animation information corresponding to the mood type of content among the animation information pre-stored in the storage 110. The animation information may be information pre-generated by the content producer.

It has been described that the processor 130 identifies error occurrence in various example embodiments, but the disclosure is not limited thereto. For example, the electronic apparatus 100 may receive a signal that indicates that there is no problem from the display device on a regular basis, and the processor 130 may determine that a problem occurs if such the signal is not received.

Figure 2B:
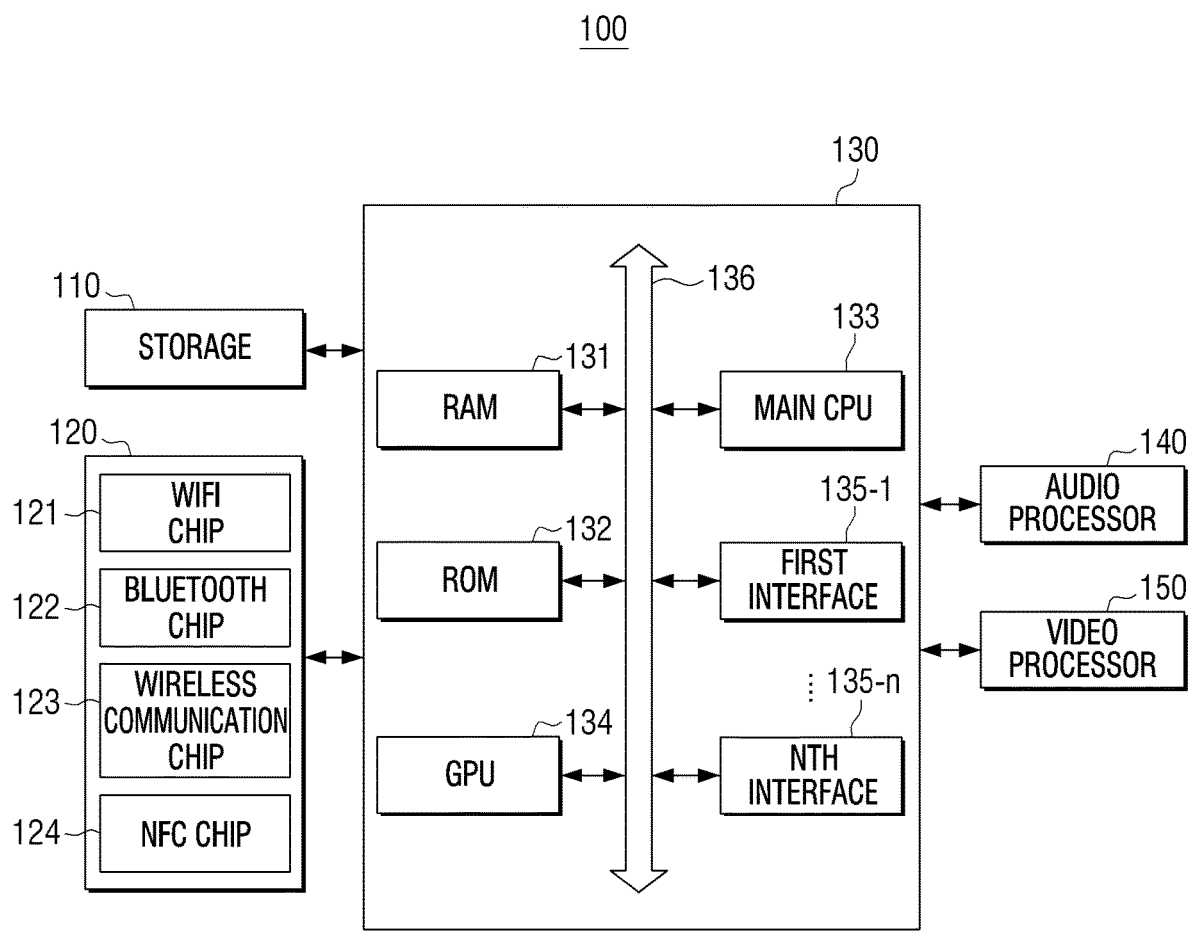
FIG. 2B is a block diagram illustrating an example configuration of an electronic apparatus according to an embodiment of the disclosure.

FIG. 2B is a block diagram illustrating an example configuration of an electronic apparatus. Referring to FIG. 2B, the electronic apparatus 100 may include a storage 110, a communicator (e.g., including communication circuitry) 120, a processor (e.g., including processing circuitry) 130, an audio processor (e.g., including audio processing circuitry) 140, and a video processor (e.g., including video processing circuitry) 150. The redundant description of elements shown in FIG. 2A may not be repeated here.

The processor 130 may include various processing circuitry and control the operations of the electronic apparatus 100 overall using various programs stored in the storage 110.

The processor 130 may include a RAM 131, a ROM 132, a CPU 133, a Graphic Processing Unit (GPU) 134, first to nth interfaces 135-1 to 135-n, and a bus 136.

The RAM 131, the ROM 132, the CPU 133, the Graphic Processing Unit (GPU) 134, the first to nth interfaces 135-1 to 135-*n*, and the like may be connected to one another via the bus 136.

The first to nth interfaces 135-1 to 135-*n* may be connected to various elements described above. One of the interfaces may be a network interface connected to an external server via a network.

The CPU 133 may access the storage 110 and perform booting by using an operating system (O/S) stored in the storage 110. The CPU 133 may perform various operations by using various programs, contents, data, etc. stored in the storage 110.

A command set, etc. for system booting may be stored in the ROM 132. When a turn-on command is input and power is supplied, the CPU 133 may copy the O/S store in the storage 110 to the RAM 131 according to the command stored in the ROM 132, execute the O/S and perform system booting. When the system booting is completed, the CPU 133 may copy the various programs stored in the storage 110 to the RAM 131, execute the program copied to the RAM 131 and perform various operations.

The GPU 134 may generate a screen including various objects such as icons, images, texts, etc. by using a calculation unit (not shown) and a rendering unit (not shown). The calculation unit may calculate attribute values such as coordinate values, shapes, sizes, colors, etc. of the objects according to the layout of the screen. The rendering unit may generate screens of various layouts including objects based on the attribute values calculated by the calculation unit. The screen (or a user interface window) generated by the rendering unit may be provided to the display 140 and displayed in a main display area and a sub-display area.

The operation of the processor 130 may be performed by the program stored in the storage 110.

The storage 110 may store various data such as, for example, and without limitation, an Operating System (O/S) software module for driving the electronic apparatus 100, a virtual space forming module, a VR image information module, a rendering module, a motion information module, an animation information module, etc.

The communicator 120 may include various communication circuitry and perform communication with various types of HMD devices according to various types of communication methods. The communicator 120 may include various communication circuitry included in a variety of chips, including, for example, and without limitation, a Wi-Fi chip 121, a Bluetooth chip 122, a wireless communication chip 123, an NFC chip, etc. The processor 130 may perform communication with various HDM devices using the communicator 120.

The Wi-Fi chip 121 or the Bluetooth chip 122 may perform communication using a Wi-Fi method, and a Bluetooth method, respectively. When the Wi-Fi chip 121 or the Bluetooth chip 122 is used, various connectivity information such as an SSID and a session key may be transmitted and received first, communication connection may be established based on the connectivity information, and various information 123 may be transmitted and received based thereon. The wireless communication chip refers to a chip that performs communication according to various communication standards such as IEEE, ZigBee, 3rd Generation (3G), 3rd Generation Partnership Project (3GPP), Long Term Evolution (LTE), etc. The NFC chip 124 refers to a chip operating in an NFC (Near Field Communication) mode using 13.56 MHz band among various RF-ID frequency bands such as 135 kHz, 13.56 MHz, 433 MHz, 860 to 960 MHz and 2.45 GHz.

The processor 130 may receive motion information from a display device through the communicator 120. The processor 130 may control the communicator 120 to transmit a VR image to a display device in real time.

The audio processor 140 may include various audio processing circuitry and perform processing of audio data. The audio processor 140 may perform various processing such as, for example, and without limitation, decoding, amplification, noise filtering, etc. of audio data.

The video processor 150 may include various video processing circuitry and be configured to process video data. The video processor 150 may perform various image processing such as, for example, and without limitation, decoding, scaling, noise filtering, frame rate conversion, resolution conversion, etc. of video data.

As described above, the processor 130 may render one area of a VR image obtained by deforming a motion of an object in real time based on motion information received from a display device, and transmit the rendered one area of the VR image to the display device.

The operation of the processor 130 will be described in greater detail with reference to the drawings.

Figure 3A:
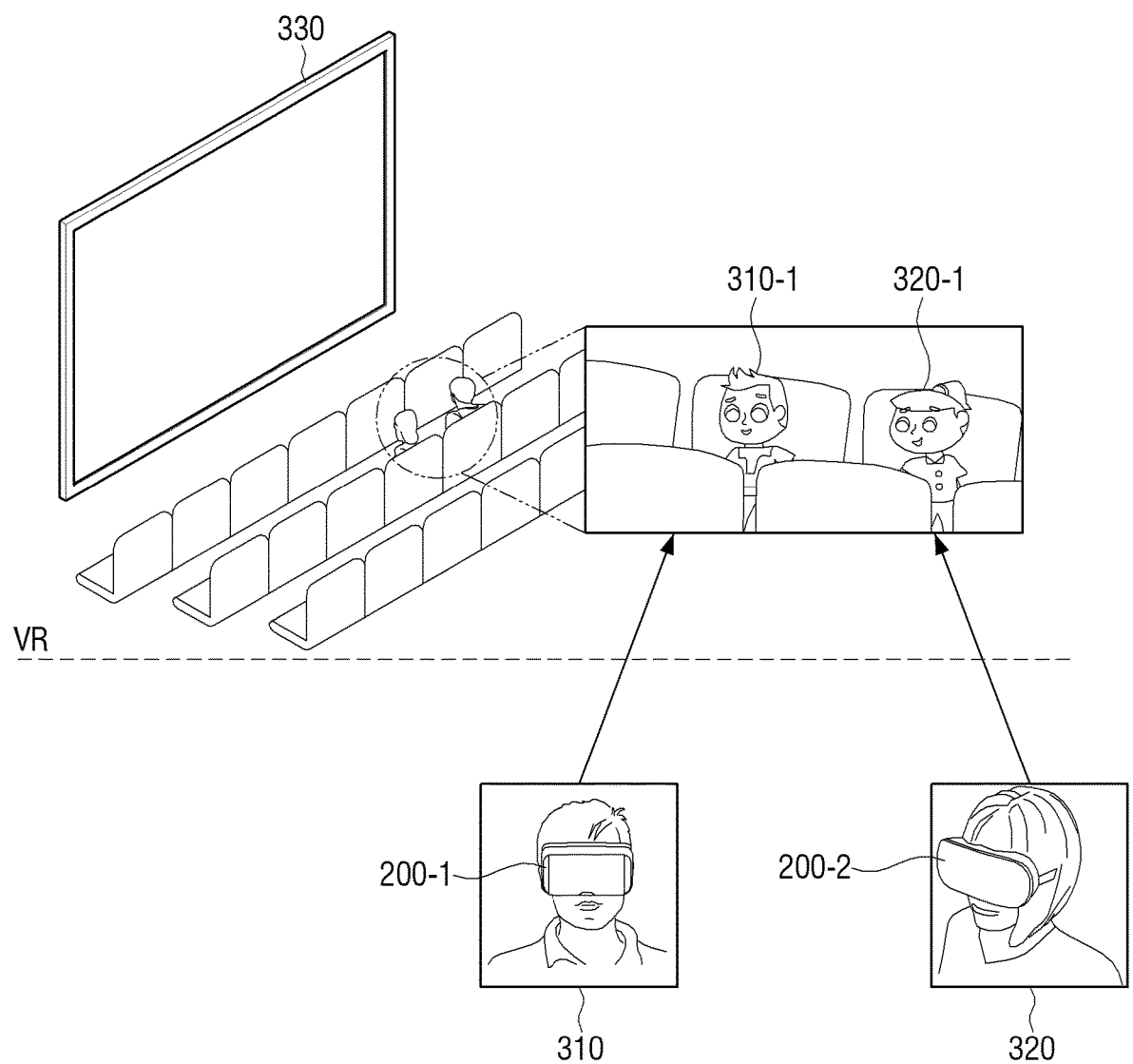
FIG. 3A, FIG. 3B, and FIG. 3C are diagrams illustrating examples of a VR image based on motion information according to various embodiments of the disclosure.
Figure 3B:
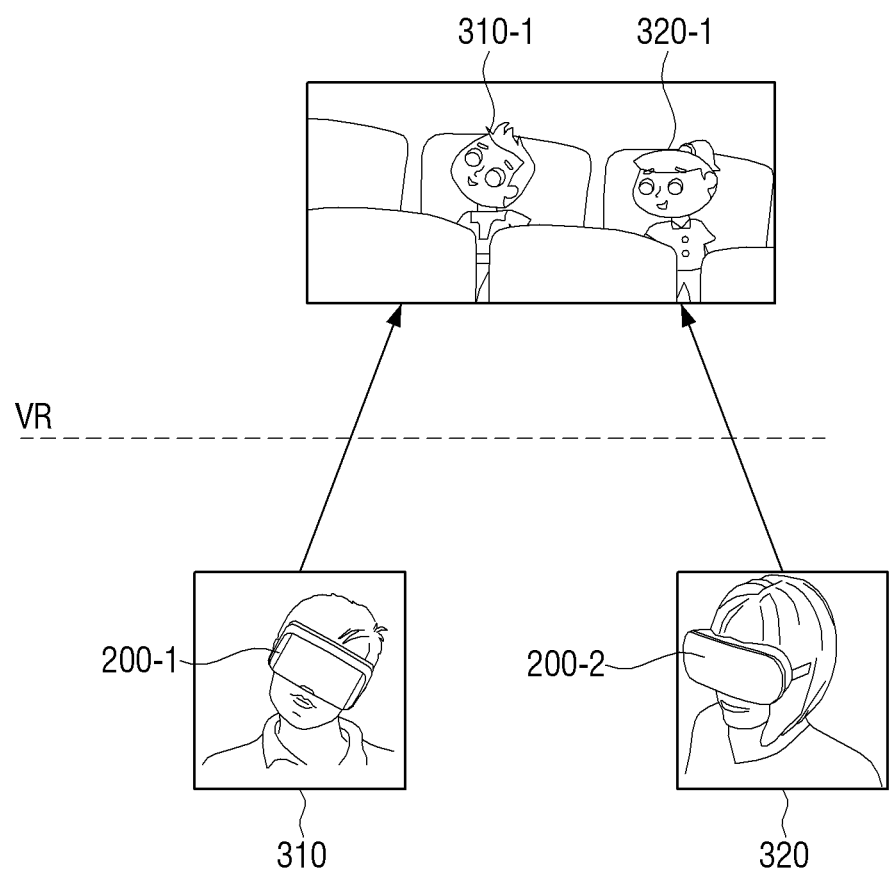
Figure 3C:
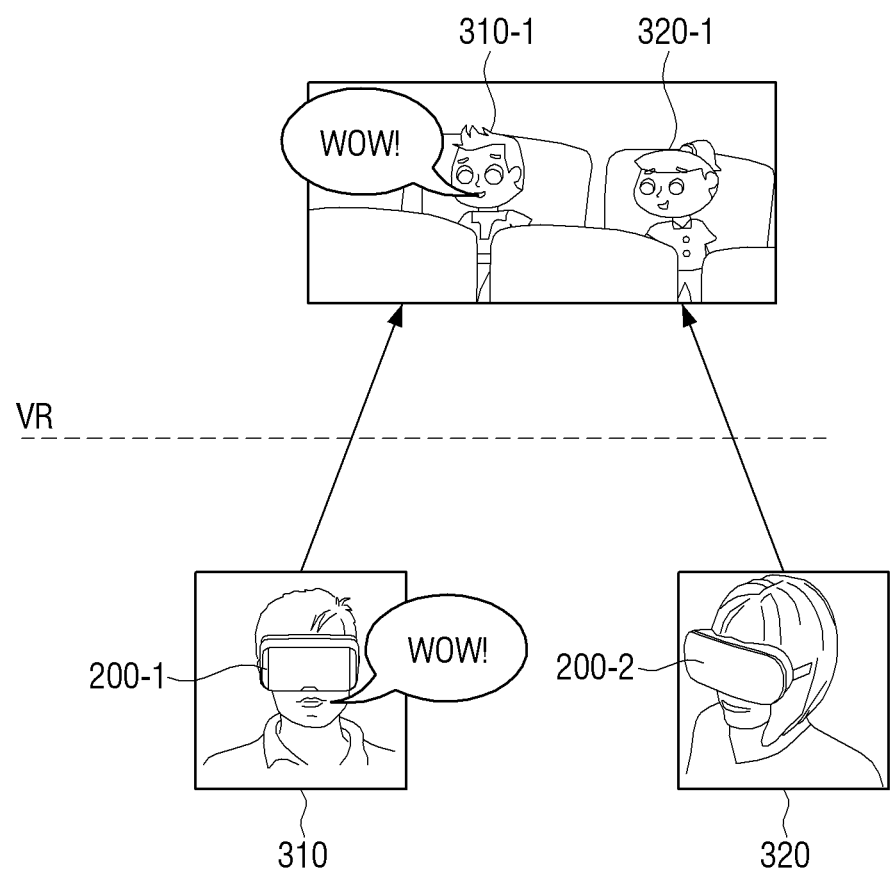

FIG. 3A, FIG. 3B, and FIG. 3C are diagrams illustrating an example VR image based on motion information according to various embodiments of the disclosure.

The processor 130 may generate a VR image in which at least one of the first and second objects is included in a virtual space. For example, at the top of FIG. 3A, the processor 130 may generate a VR image in which a first character 310-1 and a second character 320-1 are included in the theater. The first character 310-1 and the second character 320-1 may respectively correspond to the first display device 200-1 and the second display device 200-2 as shown at the bottom of FIG. 3A. The first user 310 of the display device 200-1 and the second user 320 of the second display device 200-2 may be in different places. For example, the first user 310 may be in Seoul, and the second user 320 may be in Busan.

Each of the first display device 200-1 and the second display device 200-2 may receive the first area of the VR image viewed by the first character 310-1 and the second area of the VR image viewed by the second character 320-1 from the electronic apparatus 100 and provide the first and second areas to the first user 310 and the second user 320. In other words, areas of the VR image received at the first display device 200-1 and the second display device 200-2 from the electronic apparatus 100 may be different.

The motions of the first character 310-1 and the second character 320-1 may correspond to the motions of the first user 310 and the second user 320, respectively. For example, referring to FIG. 3B, when the first user 310 rotates the head to the left, the first display device 200-1 may sense the rotation, and transmit the sensed first motion information to the electronic apparatus 100. The processor 130 may render the first character 310-1 to rotate the head to the left based on the first motion information. When the first character 310-1 rotates to the left, the first area of the VR image viewed by the first character 310-1 may be changed, and the processor 130 may transmit the changed first area of the VR image to the first display device 200-1.

When the second user 320 rotates the head to the right, the second display device 200-2 may sense the rotation, and transmit the sensed second motion information to the electronic apparatus 100. The processor 130 may render the second character 320-1 to rotate the head to the right based on the second motion information. When the second character 320-1 rotates the head to the right, the second area of the VR image viewed by the second character 320-1 may be changed, and the processor 130 may transmit the changed second area of the VR image to the second display device 200-2. When the first character 310-1 is included in the changed second area of the VR image, the second user 320 may watch a VR image in which the first character 310-1 rotates the head to the left, and recognize that the first user 310 rotates the head to the left. Therefore, by doing so, the users may feel as if they are in the same place even if the first user 310 and the second user 320 are separated at long distance. Therefore, the processor 130 may overcome the spatial limitation between users.

Referring to FIG. 3C, when the first user 310 utters a voice, the first display device 200-1 may sense the voice, and transmit the sensed first sound information to the electronic apparatus 100. The processor 130 may add the sound of the first character 310-1 to the one area of the VR image based on the received first sound information and transmit the sound.

Image information of the VR images received at the first display device 200-1 and the second display device 200-2 from the electronic apparatus 100 may be different, but sound information may be the same.

For example, the VR images received at the first display device 200-1 and the second display device 200-2 from the electronic apparatus 100 may include the same sound information of the first display device 200-1. The sound information of the first character 310-1 may include not only the sound uttered by the first character 310-1, but also information on the location of the first character 310-1. Accordingly, the first display device 200-1 may mix the sound information of the first character 310-1 so that the first character 310-1 may be directed forward from its mouth as if the first user utters, and output the mixed sound. The second display device 200-2 may mix sound information of the first character 310-1 so that the second character 320-1 may be directed from the right to the left as if the first character 310-1 on the right utters, and output mixed sound. Accordingly, the first user 310 may hear her/his voice through a speaker provided in the first display device 200-1, and recognize the voice as if the first character utters. The second user 320 may hear the voice uttered by the first user 310 through a speaker provided in the second display device 200-2, and recognize as if the first character on the left side utters. By doing so, the first user 310 and the second user 320 may experience the improved sense of immersion for the virtual space.

However, the disclosure is not limited thereto. The processor 130 may not provide sound information of the first character 310-1 to the first display device 200-1 that receives sound information. The first user 310 may directly hear her/his voice without the speaker provided in the first display device 200-1. The VR images received at the first display device 200-1 and the second display device 200-2 from the electronic apparatus 100 may have different sound information.

The processor 130 may mix the sound information of the first character 310-1 to respond to each of the first display device 200-1 and the second display device 200-2. The mixing operation of each of the first display device 200-1 and the second display device 200-2 may be performed by the processor 130. The VR images received at the first display device 200-1 and the second display device 200-2 from the electronic apparatus 100 may have different sound information. The sound information of the first character 310-1 may not include information on the location of the first character 310-1. Each of the first display device 200-1 and the second display device 200-2 may reproduce the received one area of the VR image, but may not perform an additional sound mixing operation.

Referring to FIG. 3A, the processor 130 may render a VR image including a content reproduction area 330. The processor 130 may transmit the VR images and contents to the first display device 200-1 and the second display device 200-2. The VR images or the contents may include information on the content reproduction area 330.

The first display device 200-1 and the second display device 200-2 may display a VR image so that the content received at the content reproduction area 330 may be reproduced based on information on the content reproduction area 330.

However, the disclosure is not limited thereto. The processor 130 may render a VR image in which a content itself is included in a virtual area. The processor 130 may transmit only the rendered VR image to the first display device 200-1 and the second display device 200-2, and the first display device 200-1 and the second display device 200-2 may display the received VR image without performing additional processing.

Figure 4A:
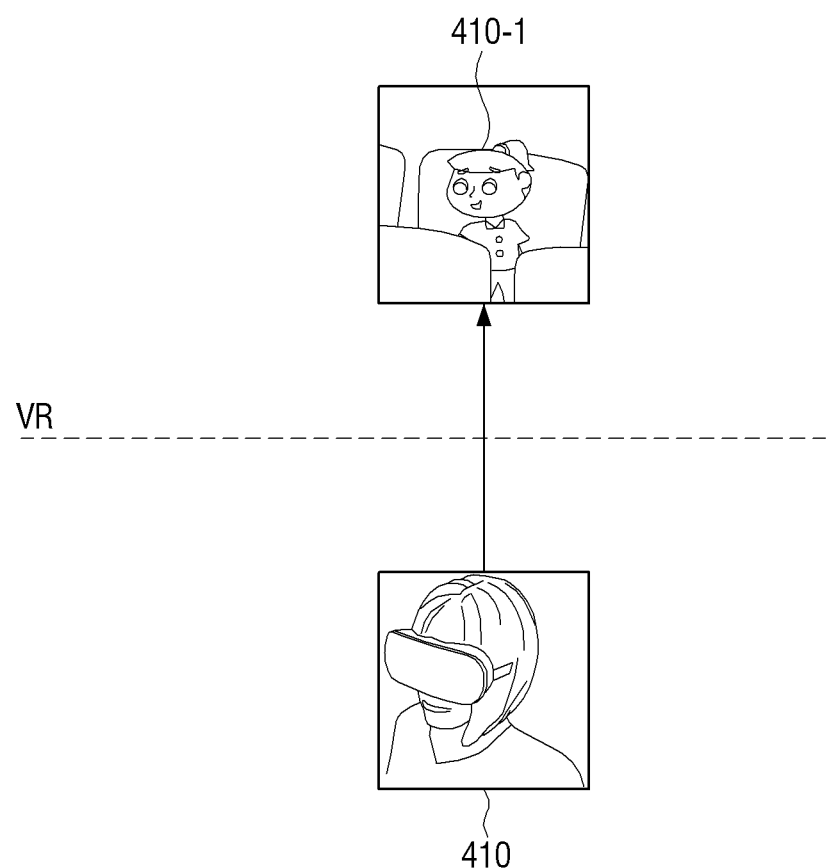
FIG. 4A and FIG. 4B are diagrams illustrating an example method of using a history according to an embodiment of the disclosure.
Figure 4B:
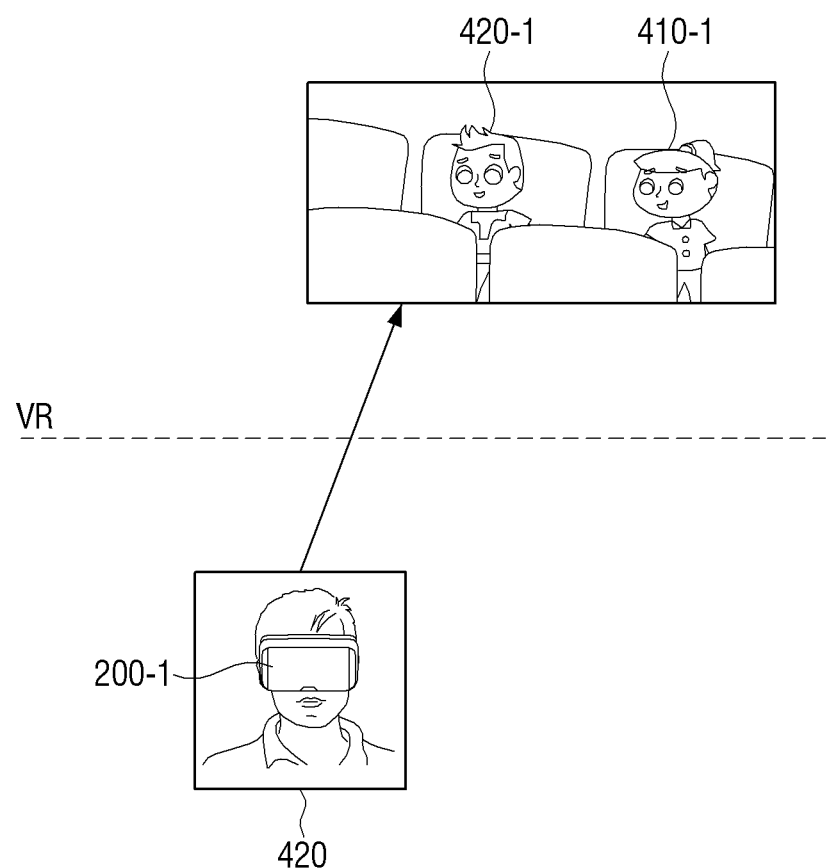

FIG. 4A and FIG. 4B are diagrams illustrating an example method of using a history according to an embodiment of the disclosure.

Referring to FIG. 4A, the third user 410 may wear the third display device, and view a content in a virtual space. The third display device may transmit the third motion information by the third user 410 to the electronic apparatus 100. The electronic apparatus 100 may render the VR image in which a third object 410-1 is included in the virtual space based on the third motion information, and provide the rendered VR image to the third display device.

The processor 130 may store the third motion information in the storage 100 by the mood type of content. For example, the processor 130 may distinguish the third motion information when the mood type of content is the first mood type, and the third information when the mood type of content is the second mood type, and store the information in the storage 110.

When different third motion information is input into a single mood type a plurality of times, the processor 130 may store one of the different third motion information in the storage 110. After the different third motion information of the single mood type is stored in the storage 110 a plurality of times, the processor 130 may randomly read the third motion information.

Referring to FIG. 4B, the first user 420 may wear the first display device 200-1, and view the content viewed by the third user 410 in the virtual space. The content viewing time of the first user 420 may be after the content viewing time of the third user 410.

The processor 130 may provide a UI for guiding whether to include the third object 410-1 corresponding to the third user 410 in the virtual space based on the view history of the third user 410 to the first display device 200-1 when the first user 420 is about view the content.

When the first user 420 input a control command for allowing the third object 410-1 to be included in the virtual space, the processor 130 may render a VR image in which the first object 420-1 corresponding to the first user 420 and the third object 410-1 are included in the virtual space, and transmit the rendered VR image to the first display device 200-1.

The processor 130 may change the motion of the third object 410-1 based on the third motion information by the mood type of content stored in the storage 110.

Through the above-described operation, even if the first user 420 and the third user 410 have difficulty in scheduling to meet up, it may provide a feeling that they share time each other. Therefore, the processor 130 may overcome the time limitation between users.

Meanwhile, as described above, it is described by way of example that the same content is viewed by users, but the disclosure is not limited thereto. For example, the processor 130 may store the third motion information in the storage 110 by mood type while the third user 410 views the first content. The processor 130, when the user 420 views the second content, may change the motion of the third object 410-1 based on the third motion information corresponding to the mood type of the second content.

The processor 130 may store the third motion information in the storage 110 regardless of the mood type. For example, the processor 130 may store the third motion information in the storage 110 at a predetermined time interval while the content of 2 hours long is reproduced. The processor 130 may match and store the third motion information and a content viewing time in the storage 120 as well as storing the third motion information. The processor 130, when the first user 420 views a content, may change the motion of the third object 410-1 based on the third motion information according to the content viewing time of the content. In this example, the content viewed by the first user 420 may be the same as the content viewed by the third user 410.

Figure 5:
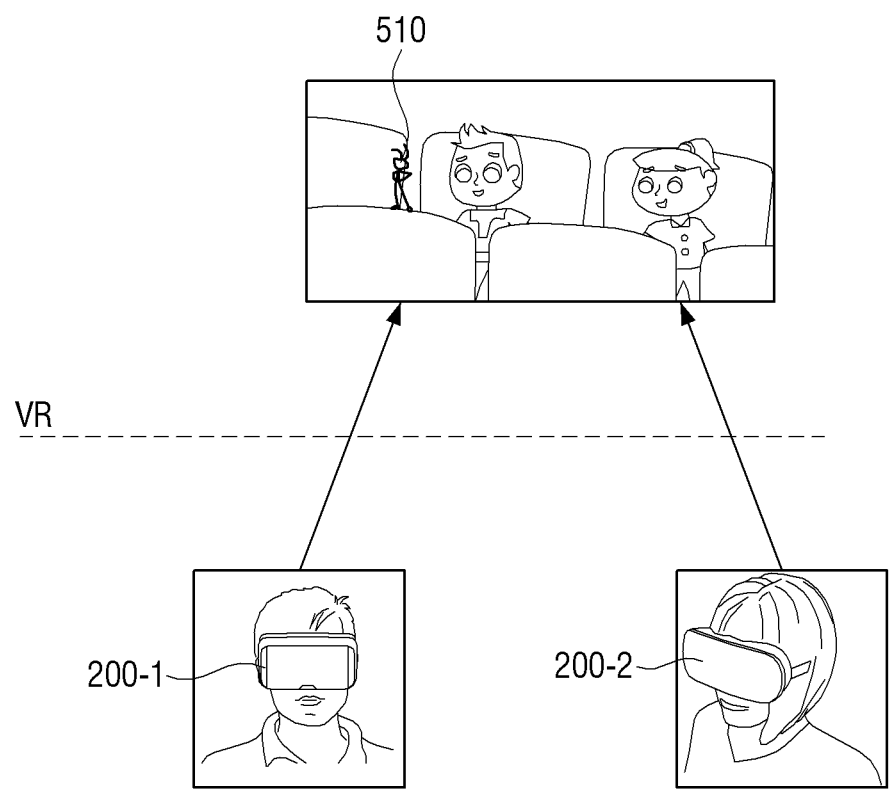
FIG. 5 is a diagram illustrating an example method for using animation information according to an embodiment of the disclosure.

FIG. 5 is a diagram illustrating an example method for using animation information according to an embodiment of the disclosure.

Referring to FIG. 5, at least one of the first user and the second user may input a control command for allowing a third object 510 irrelevant to a user to be included in a virtual space. Accordingly, the processor 130 may render a VR image in which the third object 510 is included in a virtual space, and transmit the rendered VR image to the first display device 200-1 and the second display device 200-2.

The processor 130 may render a VR image by changing the motion of the third object 510 based on animation information on the third object 510 stored in the storage 110. The animation information on the third object 510 may be motion information pre-generated by a producer in accordance with the mood type of content.

Figure 6A:
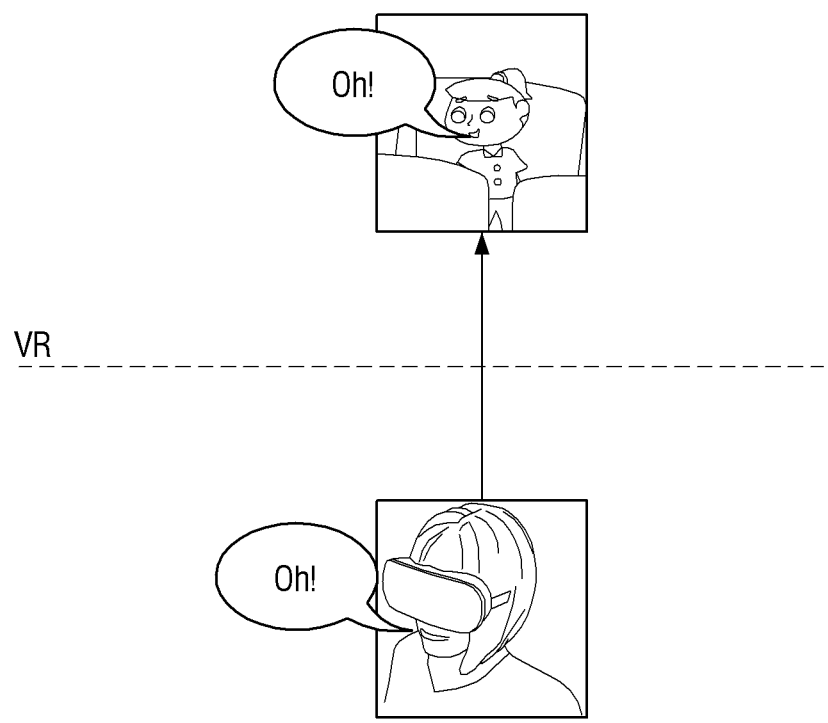
FIG. 6A and FIG. 6B are diagrams illustrating example object rendering considering a mood type according to various embodiments of the disclosure.
Figure 6B:
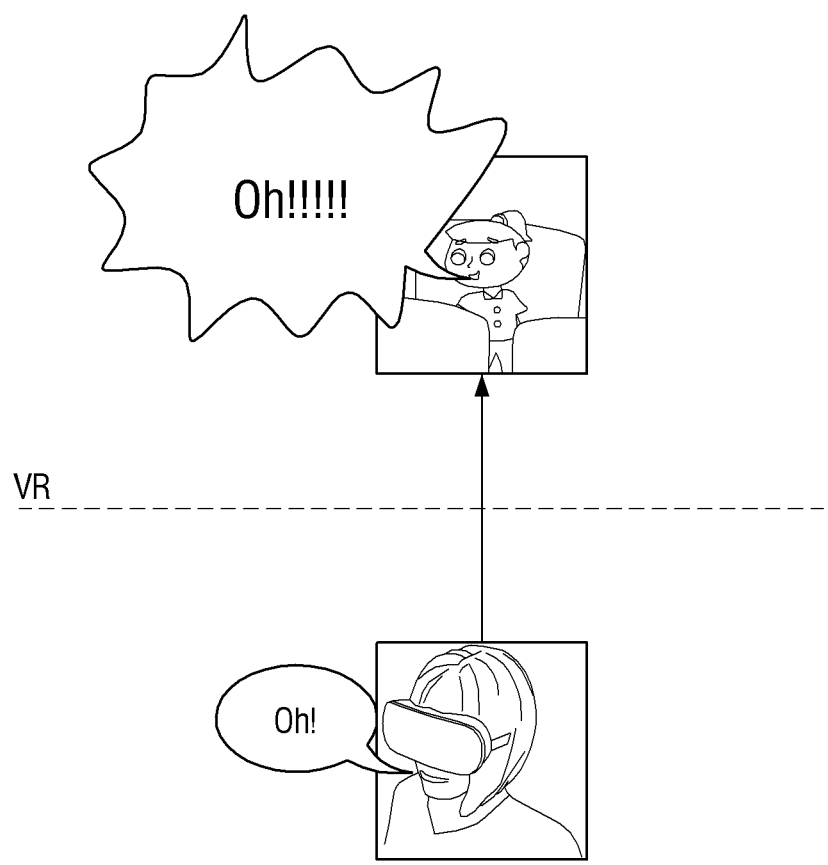

FIG. 6A and FIG. 6B are diagrams illustrating an example of object rendering considering a mood type according to various embodiments of the disclosure.

The processor 130 may add sound of the first object to a VR image based on first sound information. When the sound of the first object is added to the VR image, the processor 130 may further consider the present mood type as well as the first sound information.

For example, referring to FIG. 6A, the processor 130, when the present mood type of content is 'clam', may add the sound of the first object to the VR image to have the same sound output as the first sound information.

Referring to FIG. 6B, the processor 130, when the present mood type of content is 'surprising', may add the sound of the first object, which has the greater sound output than the first sound information, to the VR image.

As described above, for ease of explanation, only sound information has been described, but the disclosure is not limited thereto.

For example, the processor 130, when the motion of the first object is changed, may further consider the present mood type of content as well as the first motion information.

When the present mood type of content is 'clam', the processor 130 may change the motion of the first object to correspond to the first motion information. The processor 130, when the present mood type of content is 'surprising', may change the motion of the first object to be exaggerated than the first motion information.

Figure 7:
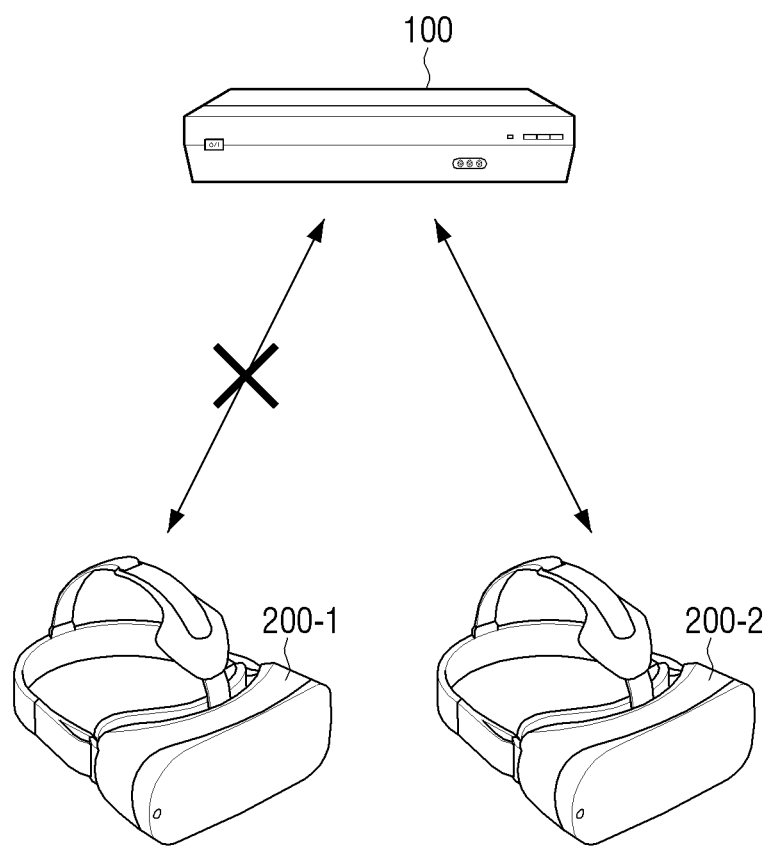
FIG. 7 is a diagram illustrating an example operation when a problem occurs according to an embodiment of the disclosure.

FIG. 7 is a diagram illustrating an example operation when a problem occurs according to an embodiment of the disclosure.

Referring to FIG. 7, an electronic system 1000 may include an electronic apparatus 100, a first display device 200-1, and a display device 200-2, and the electronic apparatus 100 may perform communication with the first display device 200-1 and the second display device 200-2.

When the first motion information is not received from the first display device 200-1 for a predetermined first time period, the processor 130 may deform the motion of the first object based on the mood type of content.

The processor 130 may store the first motion information in the storage 110 by mood type of content until a problem occurs, and when the first motion information is not received from the first display device 200-1 during a predetermined first time period, the processor 130 may deform the motion of the first object based on the first motion information corresponding to the mood type of the present reproduction section of the content among the first motion information stored in the storage 110.

When the first motion information is not received from the first display device 200-1 during a predetermined first time period, the processor 130 may deform the motion of the first object based on the animation information corresponding to the mood type among the animation information pre-stored in the storage 110.

It has been described that the first motion information is not received from the first display device 200-1 during a predetermined first time period, but the disclosure is not limited thereto. For example, the processor 130 may deform the motion of the first object without using the first motion information when the received first motion information is not changed during a predetermined second period of time, the first user requests change to another content or virtual space, and when it disturbs other users to view a content such as the first user utters a voice of predetermined volume or more, or take an excessively big motion.

Figure 8:
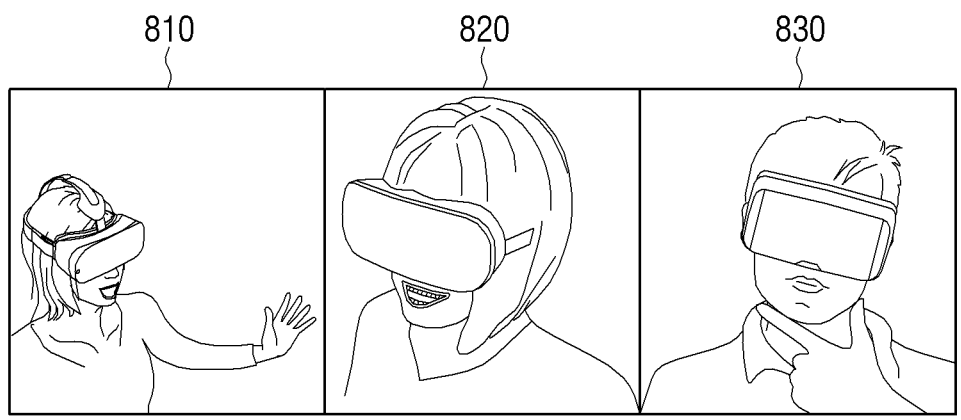
FIG. 8 is a diagram illustrating an example of storing motion information according to an embodiment of the disclosure.

FIG. 8 is a diagram illustrating an example of storing motion information according to an embodiment of the disclosure.

Referring to FIG. 8, the processor 130 may store various motion information of a user in the storage 110 of the electronic apparatus 100 upon user's request. The processor 130 may store the motion information in the storage 110 by mood type.

For example, if the processor 130 may, for example, and without limitation, store motion information 810 if the mood type is 'surprising', store motion information 820 if 'fun', and store motion information 830 if 'questioning'.

The motion information stored in the storage 110 may be read and used when a problem occurs or upon another user's request.

For example, when identifying (e.g., determining) that the first display device 200-1 has an error, the processor 130 may deform the motion of the first object based on the first motion information corresponding to the mood type of content among the pre-stored first motion information.

A user may be provided with information on the mood type of content while viewing the content, or provide information on the mood type to be stored. The processor 130 may receive the mood type and the motion information from the display device and store the mood type and the motion information in the storage 110.

Figure 9A:
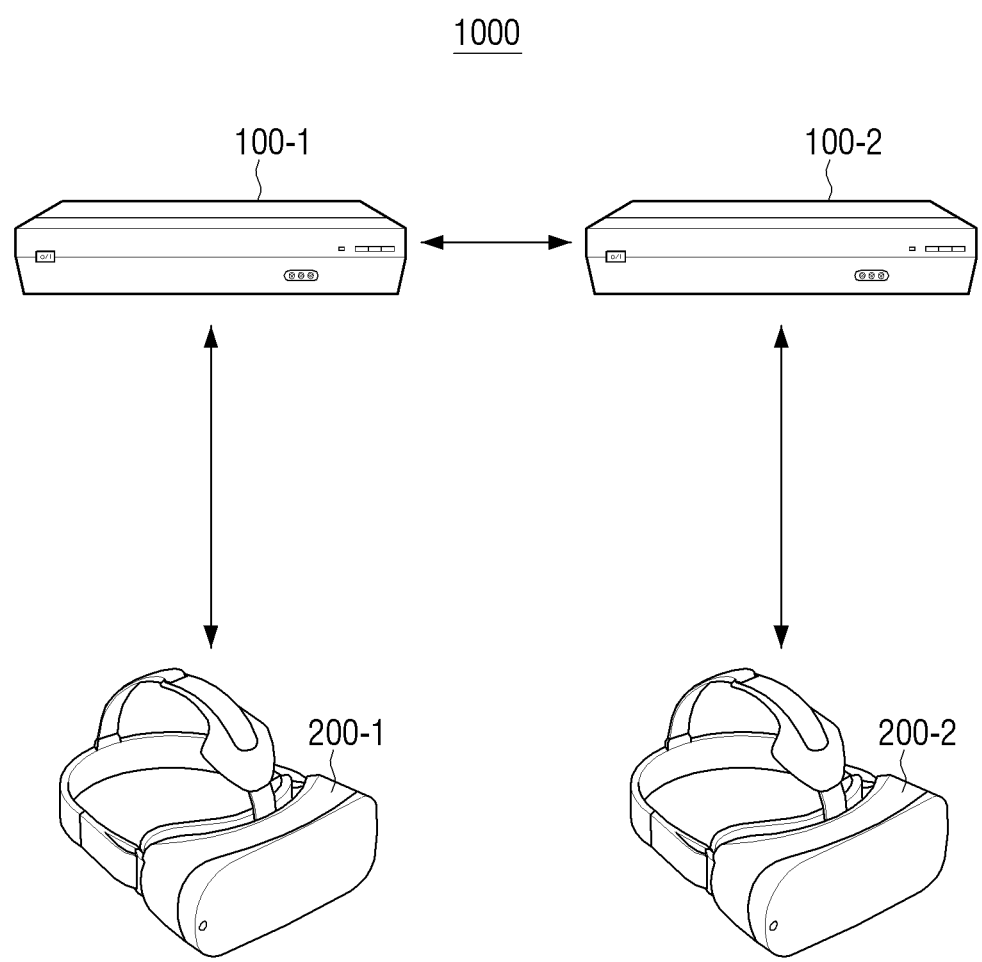
FIG. 9A and FIG. 9B are diagrams illustrating various example expansion embodiments according to an embodiment of the disclosure.
Figure 9B:
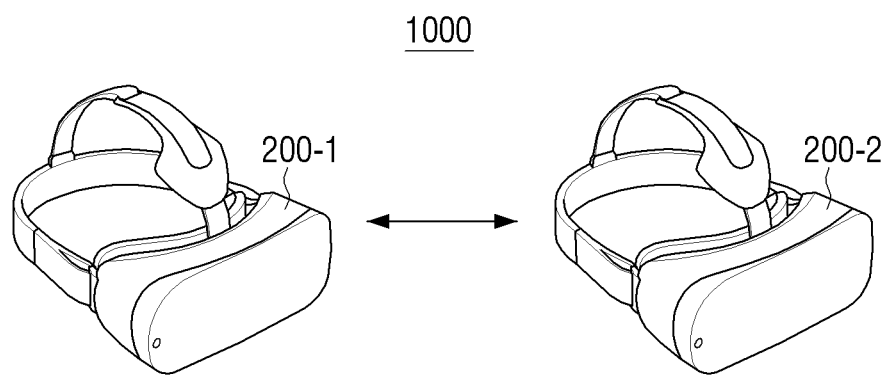

FIG. 9A and FIG. 9B are diagrams illustrating various example expansion embodiments according to an embodiment of the disclosure.

Referring to FIG. 9A, an electronic system 1000 may include a first electronic apparatus 100-1, a second electronic apparatus 100-2, a first display device 200-1, and a second display device 200-2. In this example, the operation of the electronic apparatus 100 may be performed by the first electronic apparatus 100-1 and the second electronic apparatus 100-2. One of the first electronic apparatus 100-1 and the second electronic apparatus 100-2 may perform most of the operations of the electronic apparatus 100 of FIG. 1 as a main device, and the other of the first electronic apparatus 100-1 and the second electronic apparatus 100-2 may perform the remaining of the operations of the electronic apparatus 100 of FIG. 1.

For example, when the first electronic apparatus 100-1 operates as a main device, the first electronic apparatus 100-1 may render a VR image, and mix first sound information to correspond to the first display device 200-1. The second electronic apparatus 100-2 may receive a VR image and first sound information from the first electronic apparatus 100-1 and mix the VR image and the first sound information to correspond to the second display device 200-2.

According to the above-described embodiment, it has been described that a sub-device performs only sound mixing, but a main device and a sub-device may operate using any other method. For example, it is possible for the first electronic apparatus 100-1 and the second electronic apparatus 100-2 use cloud computing to operate.

Referring to FIG. 9B, an electronic system 1000 may include a first display device 200-1 and a second display device 200-2. In this example, the operation of the electronic apparatus 100 of FIG. 1 may be performed by the first display device 200-1 and the second display device 200-2. One of the first display device 200-1 and the second display device 200-2 may perform most of the operations of the electronic apparatus 100 of FIG. 1 as a main device, and the other of the first display device 200-1 and the second display device 200-2 may perform the remaining operation of the electronic apparatus 100 of FIG. 1 as a sub-device.

Figure 10:
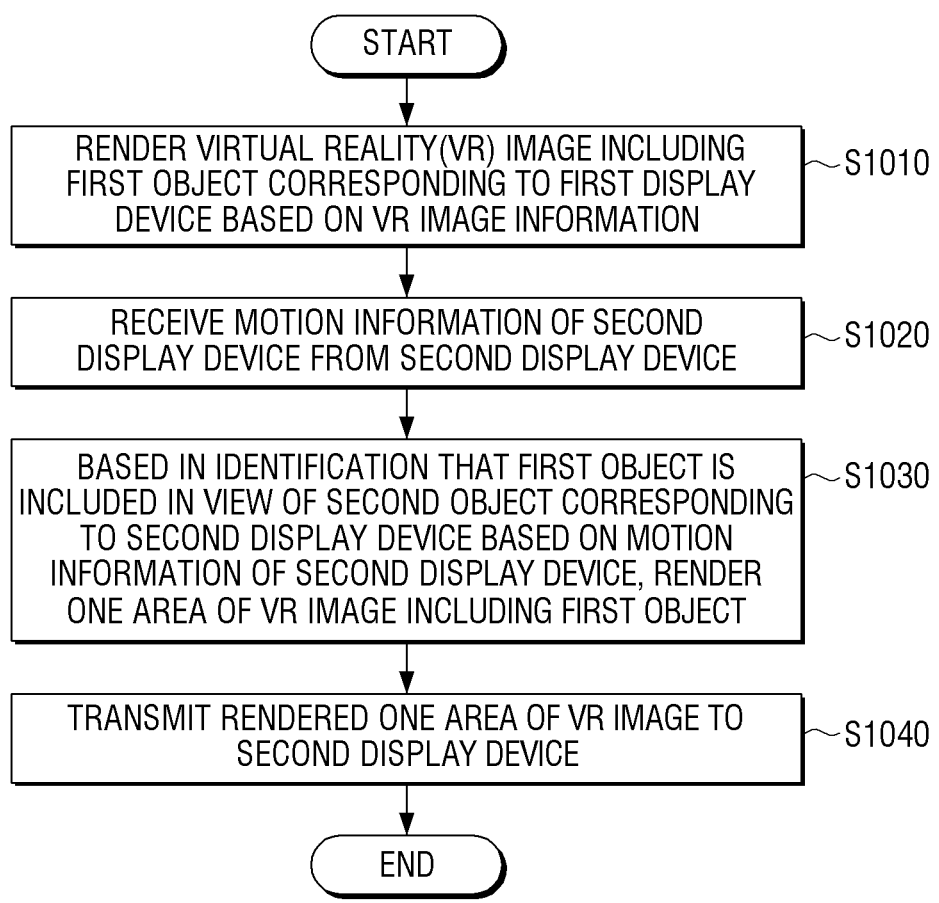
FIG. 10 is a flowchart illustrating an example method of controlling an electronic apparatus according to an embodiment of the disclosure.

FIG. 10 is a flowchart illustrating an example method for controlling an electronic apparatus according to an embodiment of the disclosure.

The method may include rendering a virtual reality (VR) image including the first object corresponding to the first display device based on VR image information at step S1010. In addition, second motion information of the second display device may be received from a second display device at step S1020. When it is determined that a first object is included in the view of a second object corresponding to the second display device based on motion information of the second display device, one area of a VR image including the first object may be rendered at step S1030. The rendered one area of the VR image may be transmitted to the second display device at step S1040.

The rendering of the one area of the VR image S1030 may include receiving motion information of the first display device from the first display device, and rendering the one area of the VR image by deforming the motion of the first object based on the motion information of the first display device.

The rendering of the one area of the VR image 1030 may include identifying the view of the second object based on the location of the second object and the motion information of the second display device.

The rendering of the VR image S1010 may include rendering the VR image including a content reproduction area.

The transmitting S1040 may include transmitting a content to the second display device, and the rendering of the one area of the VR image S1030 may include deformation of the motion of the first object based on the motion information of the first display device and the mood type of content during a predetermined reproduction section based on a time point when the motion information of the second display device is received.

The rendering of the one area of the VR image S1030 may include, based on a third object being further included in the view of the second object, rendering one area of a VR image by changing the motion of the third object based on the pre-stored motion information of the third object, and the transmitting S1040 may include transmitting the one area of the VR image and the content to the second display device, and the motion information of the third object may be motion information received form the third display device while the content is reproduced in the third display device.

The rendering of the one area of the VR image S1030 may include, based on the third object being further included in the view of the second object, rendering one area of the VR image by deforming the motion of the third object based on the pre-stored animation information on the third object, and the animation information on the third object may be motion information pre-generated by a produced in accordance with the mood type of content.

The transmitting S1040 may include adding and transmitting the sound of the first object to the rendered one area of the VR image based on the first sound information received from the first display device.

According to various example embodiments of the disclosure, an electronic apparatus may change the motion of an object corresponding to a display device in a virtual space based on motion information received from the display device and provide an emotion state of a user of the display device to a user of another display device.

According to an example embodiment of the disclosure, various embodiments described above may be embodied as the form of software, including instructions stored on machine-readable storage media readable by a machine (e.g., a computer). The machine may be an apparatus that calls a command stored in a storage medium and is operable according to the called command, including an electronic apparatus in accordance with the disclosed example embodiments (e.g., an electronic apparatus (A)). When the command is executed by a processor, the processor may perform the function corresponding to the command, either directly or under the control of the processor, using other components. The command may include a code generated by a compiler or executed by an interpreter. The machine-readable storage medium may be provided in the form of a non-transitory storage medium. The 'non-temporary' storage medium does not include a signal but is tangible, but does not distinguish whether data is stored semi-permanently or temporarily on a storage medium.

According to an embodiment, the method according to various embodiments disclosed herein may be provided in a computer program product. A computer program product may be traded between a seller and a purchaser as a commodity. A computer program product may be distributed in the form of a machine-readable storage medium (e.g., compact disc read only memory (CD-ROM)) or distributed online through an application store (e.g., PlayStore™). In the case of on-line distribution, at least a portion of the computer program product may be temporarily stored, or temporarily created, on a storage medium such as a manufacturer's server, a server of an application store, or a memory of a relay server.

The various example embodiments described above may be implemented in a recording medium that can be read by a computer or a similar device using software, hardware, or a combination thereof. In some cases, embodiments described herein may be implemented by a processor itself. According to software implementation, embodiments such as the procedures and functions described herein may be implemented in separate software modules. Each of the software modules may perform one or more of the functions and operations described herein.

Computer instructions for performing a processing operations of a device in accordance with various embodiments described above may be stored in a non-transitory computer-readable medium. The computer instructions stored in the non-volatile computer-readable medium cause a particular device to perform the processing operation on the device according to various embodiments described above when executed by the processor of the particular device. The non-transitory computer readable medium refers to a medium that stores data semi-permanently, and is readable by an apparatus. For example, the above-described various applications or programs may be stored in a non-transitory computer readable medium such as, for example, and without limitation, a compact disc (CD), a digital versatile disk (DVD), a hard disk, a Blu-ray disk, a universal serial bus (USB) memory stick, a memory card, and a read only memory (ROM), and may be provided.

Each of the components (e.g., modules or programs) according to various embodiments may consist of a single entity or a plurality of entities, and some subcomponents of the abovementioned subcomponents may be omitted, or other components may be further included in various embodiments. Alternatively or additionally, some components (e.g., modules or programs) may be integrated into one entity to perform the same or similar functions performed by each component prior to integration. Operations performed by modules, programs, or other components, in accordance with various embodiments, may be executed sequentially, in parallel, repetitively, or heuristically, or at least some operations may be performed in a different order, or omitted, or another function may be further added.

Although various example embodiments have been illustrated and described, it will be appreciated by those skilled in the art that various changes in form and details may be made to these embodiments without departing from the principles and spirit of the disclosure. Accordingly, the scope of the disclosure is not limited to the described embodiments, but may be defined, for example, by the appended claims as well as equivalents thereto.

What is claimed is:

1. An electronic apparatus, comprising:
a storage; and
a communicator comprising communication circuitry; and
a processor configured to:
render a virtual reality (VR) image including a first object corresponding to a first display device based on VR image information stored in the storage,
wherein the processor is further configured to:
receive a first motion information of the first display device from the first display device and a second motion information of a second display device from the second display device through the communicator,
render one area of the VR image including the first object being included in a view from a second object corresponding to the second display device based on the second motion information, and
control the communicator to transmit the rendered one area of the VR image to the second display device,
wherein a motion of the first object in the rendered one area of the VR image is rendered based on at least the first motion information.

2. The apparatus as claimed in claim 1, wherein the processor is further configured to identify a view of the second object based on a location of the second object and the motion information of the second display device.

3. The apparatus as claimed in claim 1, wherein the processor is further configured to render the VR image including a content reproduction area for the content.

4. The apparatus as claimed in claim 1, wherein the processor is further configured to:
change the motion of the first object based on a mood type of the content during a predetermined reproduction section based on a time point of the motion information of the second display device being received, and the motion information of the first display device.

5. The apparatus as claimed in claim 1, wherein the processor is further configured to:
render one area of the VR image based on a third object being included in the view of the second object by changing a motion of the third object based on motion information of the third object stored in the storage, and
control the communicator to transmit the rendered one area of the VR image and the content to the second display device,
wherein the motion information of the third object includes motion information received from a third display device based on the content being reproduced by the third display device.

6. The apparatus as claimed in claim 1, wherein the processor is further configured to render the rendered one area of the VR image based on a third object being further included in the view of the second object by changing a motion of the third object based on animation information of the third object stored in the storage, and
wherein the animation information of the third object includes motion information pre-generated by a producer based on the mood type of the content.

7. The apparatus as claimed in claim 1, wherein the processor is further configured to: add a sound of the first object to the rendered one area of the VR image based on first sound information received from the first display device, and control the communicator to transmit the VR image.

8. The apparatus as claimed in claim 1, wherein the processor is further configured to:
change the motion of the first object based on the mood type of the content based on the motion information of the first display device not being received from the first display device during a predetermined first time period, or the received motion information of the first display device not being changed during a predetermined second time period.

9. The apparatus as claimed in claim 8, wherein the processor is further configured to:
store the received motion information of the first display device in the storage based on the mood type of the content,
change the motion of the first object based on motion information corresponding to a mood type of a present reproduction section of the content among motion information of the first display device stored in the storage based on the motion information of the first display device not being received from the first display device during the predetermined first time period, or the received motion information of the first display device not being changed during the predetermined second time period.

10. The apparatus as claimed in claim 9, wherein the processor is further configured to change the motion of the first object based on animation information corresponding to the mood type among animation information stored in the storage based on the motion information corresponding to the mood type of the present reproduction section of the content not being stored in the storage.

11. An electronic system, comprising:
a first display device comprising a display;
a second display device comprising a display; and
an electronic apparatus comprising processing circuitry configured to render a virtual reality (VR) image including a first object corresponding to the first display device based on VR image information,
wherein the electronic apparatus is further configured to:
receive first motion information of the first display device from the first display device,
receive second motion information of a second display device from the second display device,
render one area of the VR image including the first object being included in a view from a second object corresponding to the second display device based on second motion information, and
transmit the rendered one area of the VR image to the second display device, wherein a motion of the first object in the rendered one area of the VR image is rendered based on the first motion information.

12. A method of controlling an electronic apparatus, the method comprising:
rendering a virtual reality (VR) image including a first object corresponding to a first display device based on VR image information;
receiving motion information of a predetermined size or more of a second display device from the second display device;
receiving first motion information of the first display device from the first display device, and second motion information of a second display device from the second display device;
rendering one area of the VR image including the first object being included in a view of from a second object corresponding to the second display device based on the second motion information; and
transmitting the rendered one area of the VR image to the second display device, wherein a motion of the first object in the rendered one area of the VR image is rendered based on at least the first motion information.

13. The method as claimed in claim 12, wherein the rendering of the one area of the VR image comprises identifying the view of the second object based on a location of the second object and the motion information of the second display device.

14. The method as claimed in claim 12, wherein the rendering of the VR image comprises rendering the VR image including a content reproduction area for the content.

15. The method as claimed in claim 12
wherein the rendering of the one area of the VR image comprises changing the motion of the first object based on the mood type of the content during a predetermined reproduction section based on a time point of the motion information of the second display device being received, and the motion information of the first display device.

16. The method as claimed in claim 12, wherein the rendering of the one area of the VR image comprises:
rendering the one area of the VR image based on a third object being included in the view of the second object by changing a motion of the third object based on pre-stored motion information of the third object,
wherein the transmitting comprises transmitting the one area of the VR image and the content to the second display device, and
wherein the pre-stored motion information of the third object includes motion information received from a third display device based on the content being reproduced by the third display device.

17. The method as claimed in claim 12, wherein the rendering of the one area of the VR image comprises,
rendering the one area of the VR image based on a third object being included in the view of the second object by changing a motion of the third object based on pre-stored animation information of the third object, and
wherein the pre-stored animation information of the third object includes motion information pre-generated by a producer based on the mood type of the content.

18. The method as claimed in claim 12, wherein the transmitting comprises adding sound of the first object to the rendered one area of the VR image based on first sound information received from the first display device and transmitting the VR image.

* * * * *